(12) United States Patent  
Biskeborn et al.

(10) Patent No.: US 8,773,810 B2
(45) Date of Patent: Jul. 8, 2014

(54) ADJUSTABLE SPAN RECORDING HEAD

(75) Inventors: Robert G. Biskeborn, Hollister, CA (US); Calvin S. Lo, Saratoga, CA (US); Gary M. McClelland, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 13/010,731

(22) Filed: Jan. 20, 2011

(65) Prior Publication Data

US 2012/0188665 A1 Jul. 26, 2012

(51) Int. Cl.
*G11B 5/584* (2006.01)
*G11B 21/02* (2006.01)

(52) U.S. Cl.
USPC .......................................... 360/77.12; 360/75

(58) Field of Classification Search
None
See application file for complete search history.

(56) References Cited

U.S. PATENT DOCUMENTS

| | | | |
|---|---|---|---|
| 5,021,906 A * | 6/1991 | Chang et al. ............... | 360/235.1 |
| 5,636,088 A * | 6/1997 | Yamamoto et al. ......... | 360/245.1 |
| 5,982,592 A | 11/1999 | Saito et al. | |
| 6,222,698 B1 | 4/2001 | Barndt et al. | |
| 6,246,552 B1 | 6/2001 | Soeno et al. | |
| 6,611,399 B1 * | 8/2003 | Mei et al. ................... | 360/234.7 |
| 6,757,128 B2 | 6/2004 | Yip | |
| 7,068,473 B2 | 6/2006 | O'Neill | |
| 7,239,465 B1 | 7/2007 | Watson et al. | |
| 7,301,724 B2 | 11/2007 | Brittenham | |
| 7,342,738 B1 | 3/2008 | Anderson et al. | |
| 7,393,066 B2 | 7/2008 | Dugas et al. | |
| 7,474,495 B2 | 1/2009 | Weng et al. | |
| 7,486,464 B2 | 2/2009 | Saliba | |
| 7,505,221 B2 | 3/2009 | Watson | |
| 7,529,060 B2 | 5/2009 | Simmons, Jr. et al. | |
| 7,738,212 B2 | 6/2010 | Saliba et al. | |
| 7,764,460 B2 * | 7/2010 | Bates et al. ................ | 360/77.12 |
| 8,184,394 B2 * | 5/2012 | Poorman et al. .......... | 360/77.12 |
| 8,310,778 B2 * | 11/2012 | Biskeborn et al. ........ | 360/77.12 |
| 2010/0067139 A1 | 3/2010 | Bates et al. | |

FOREIGN PATENT DOCUMENTS

WO 2010/044784 A1 4/2010

OTHER PUBLICATIONS

U.S. Appl. No. 13/026,142, filed Feb. 11, 2011.
Non-Final Office Action from U.S. Appl. No. 13/026,142 dated May 9, 2013.
Notice of Allowance and Fee(s) Due from U.S. Appl. No. 13/026,142 dated Mar. 31, 2014.

* cited by examiner

*Primary Examiner* — K. Wong
(74) *Attorney, Agent, or Firm* — Zilka-Kotab, PC

(57) ABSTRACT

In one general embodiment, a system includes a module having multiple transducers; and a sizing mechanism for actively applying a force to at least one lateral side of the module for selectively compressing the module, thereby adjusting a pitch between the transducers, wherein the lateral side of the module intersects an axis of the module oriented parallel to the direction of the force. Additional systems and methods are also presented.

20 Claims, 10 Drawing Sheets

ADJUSTABLE SPAN RECORDING HEAD

BACKGROUND

The present invention relates to data storage systems, and more particularly, this invention relates to a tape-based data storage system having an adjustable span recording head.

SUMMARY

A system according to one embodiment includes a module having multiple transducers; and a sizing mechanism for actively applying a force to at least one lateral side of the module for selectively compressing the module, thereby adjusting a pitch between the transducers, wherein the lateral side of the module intersects an axis of the module oriented parallel to the direction of the force.

A system according to one embodiment includes a magnetic head comprising a module having multiple transducers; a sizing mechanism for applying a force to at least one lateral side of the module for selectively compressing the module, thereby adjusting a pitch between the transducers, wherein the lateral side of the module intersects an axis of the module oriented parallel to the direction of the force; a drive mechanism for passing a magnetic medium over the magnetic head, and a controller electrically coupled to the magnetic head.

A method according to one embodiment includes determining a spacing between at least two tracks on a magnetic tape; and adjusting a spacing between transducers in a module using a sizing mechanism for actively applying a force to at least one lateral side of the module for selectively compressing the module, thereby adjusting a pitch between the transducers, wherein the lateral side of the module intersects an axis of the module oriented parallel to the direction of the force.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

According to various embodiments of the present invention, a multi-transducer head is compressed in a direction transverse to the tape motion direction. This is accomplished via any of several embodiments, such as mechanical, thermo-mechanical or piezoelectrical compression mechanisms. Preferred embodiments are capable of effectively eliminating misregistration within the range of operation of the device.

In one general embodiment, a system includes a module having multiple transducers; and a sizing mechanism for actively applying a force to at least one lateral side of the module for selectively compressing the module, thereby adjusting a pitch between the transducers, wherein the lateral side of the module intersects an axis of the module oriented parallel to the direction of the force.

In another general embodiment, a system includes a magnetic head with a module having multiple transducers; a sizing mechanism for applying a force to at least one lateral side of the module for selectively compressing the module, thereby adjusting a pitch between the transducers, wherein the lateral side of the module intersects an axis of the module oriented parallel to the direction of the force; a drive mechanism for passing a magnetic medium over the magnetic head, and a controller electrically coupled to the magnetic head.

In another general embodiment, a method includes determining a spacing between at least two tracks on a magnetic tape; and adjusting a spacing between transducers in a module using a sizing mechanism for actively applying a force to at least one lateral side of the module for selectively compressing the module, thereby adjusting a pitch between the transducers, wherein the lateral side of the module intersects an axis of the module oriented parallel to the direction of the force.

Figure 1:
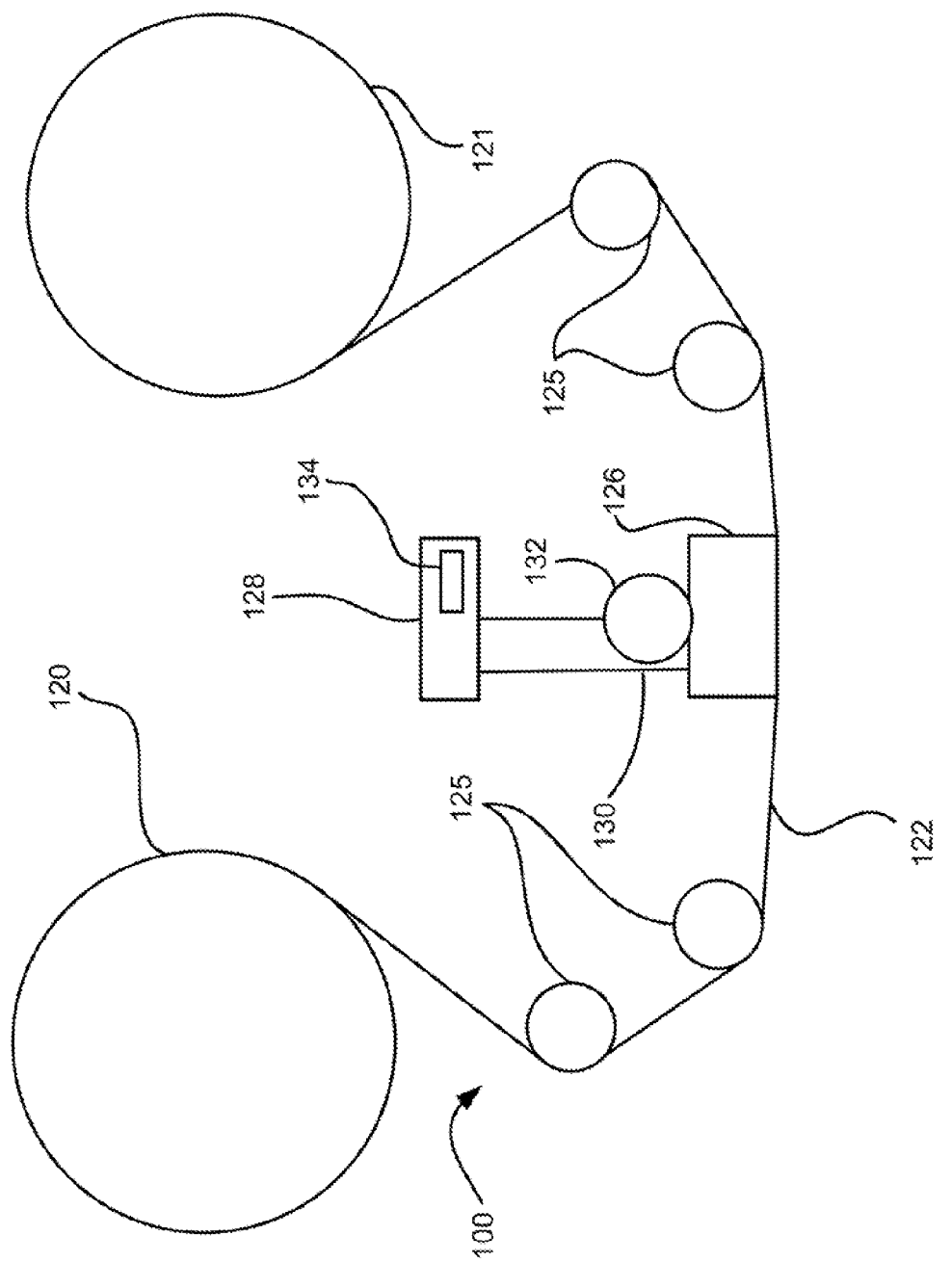
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
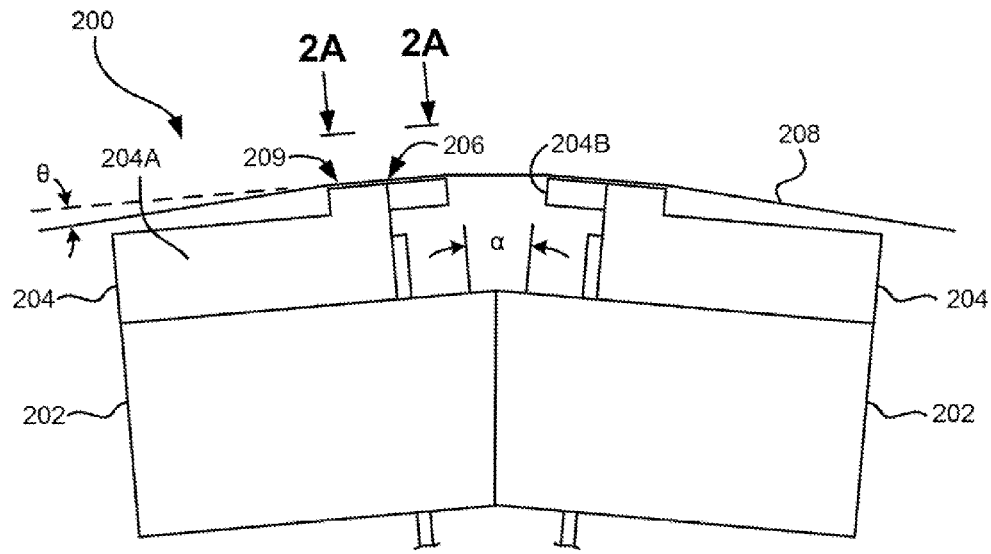
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between 0.1 degree and 5 degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo track readers for reading the servo data on the medium.

Figure 2A:
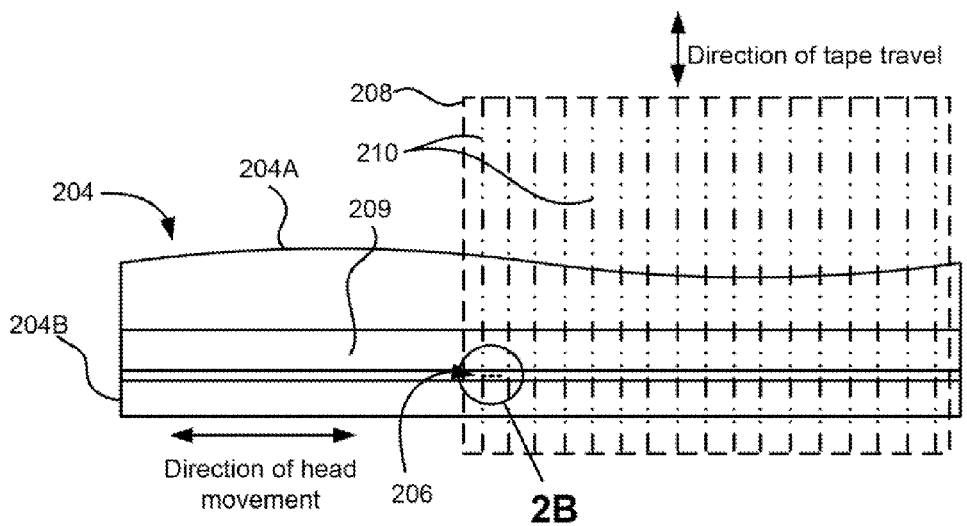
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., 16 data bands separated by 17 servo tracks 210, as shown in FIG. 2A on a one-half inch wide tape 208. The data bands are defined between servo tracks 210. Each data band may include a number of data tracks, for example 512 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
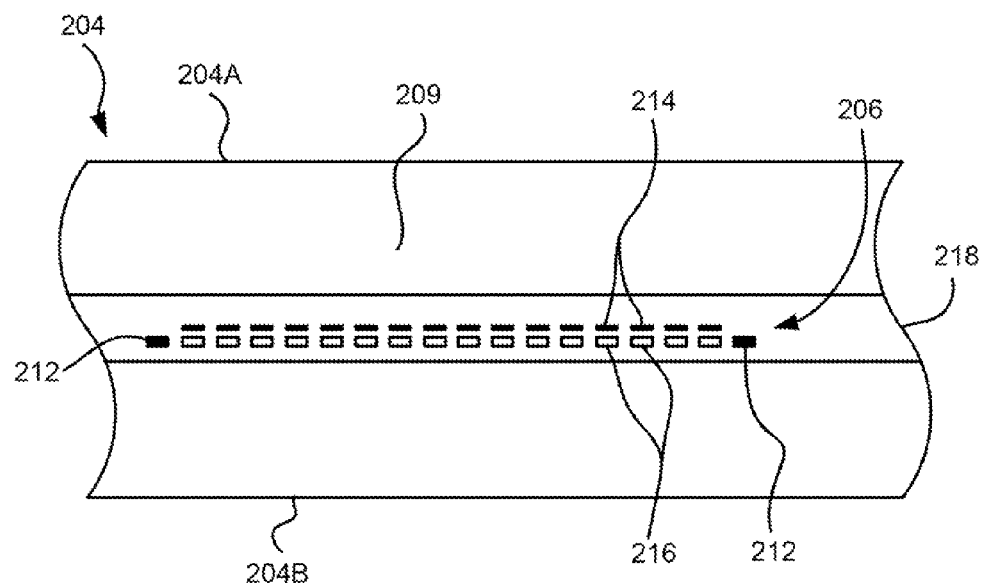
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 readers and/or writers 206 per array. A preferred embodiment includes 32 active readers per array and/or 32 active writers per array, where the actual number of transducing elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
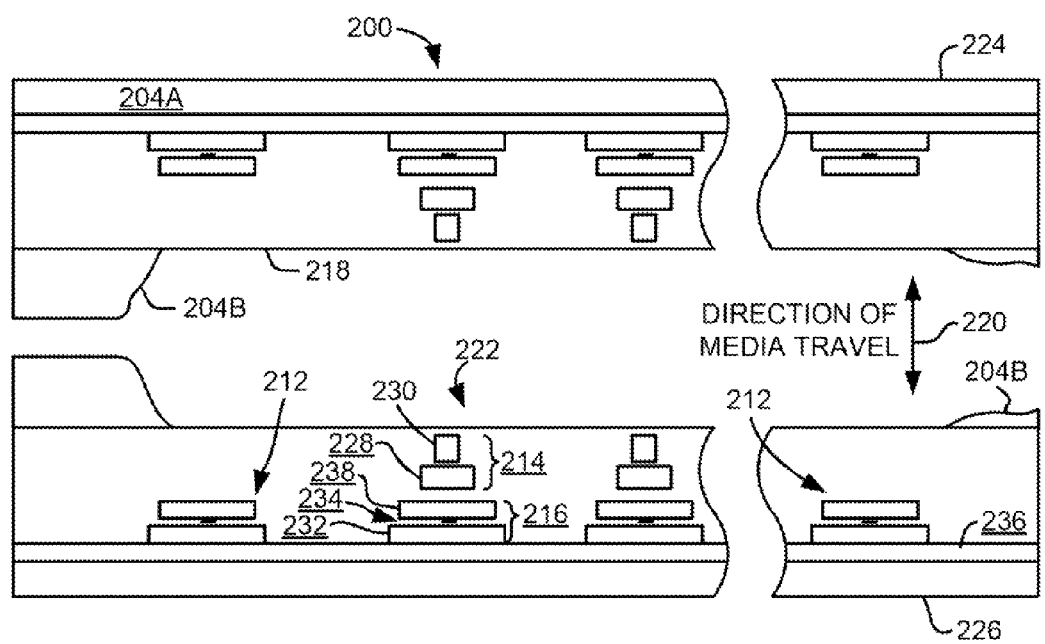
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) transducer pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

As noted above, tape lateral expansion and contraction presents many challenges to increasing data track density on tape. In an ideal situation, the tape drive system would always be able to write tracks onto the tape in the proper position based on the servo signals derived from the tape, regardless of the extent of tape lateral expansion or contraction at any given time.

Figure 3:
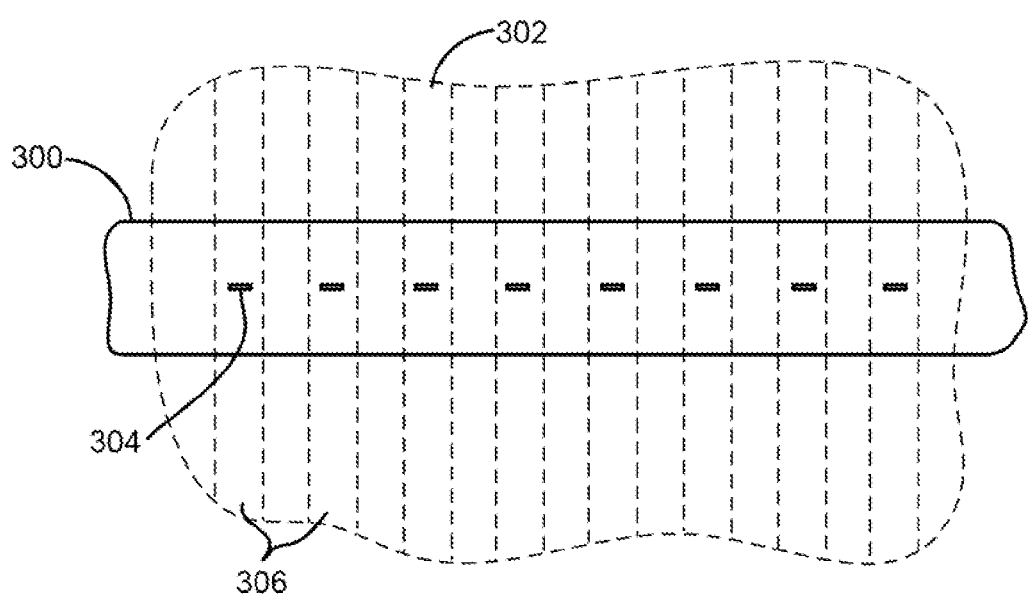
FIG. 3 is a simplified diagram depicting a module of a magnetic tape head above a tape having a nominal state of expansion.
Figure 4A:
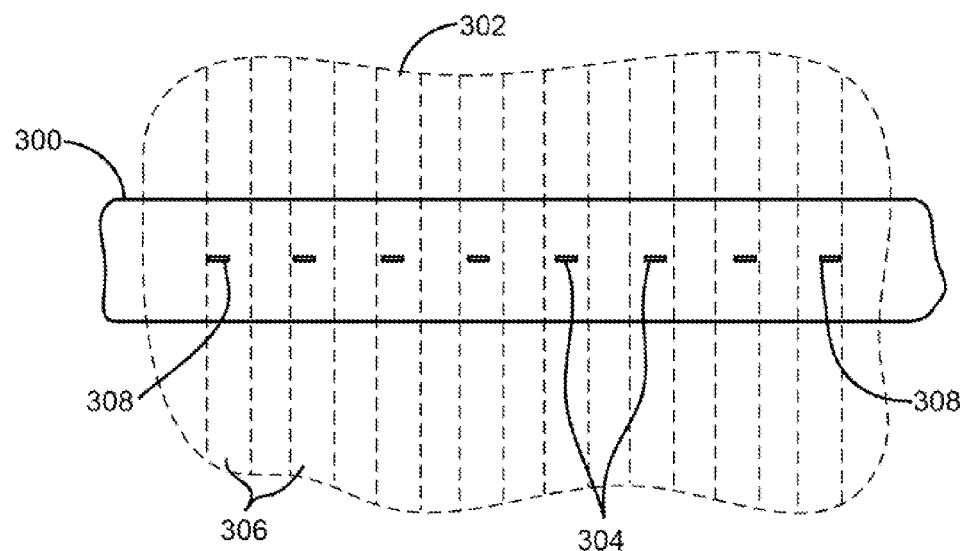
FIGS. 4A-4B are simplified diagrams depicting the effect of tape lateral contraction and expansion relative to a module of a magnetic tape head.
Figure 4B:
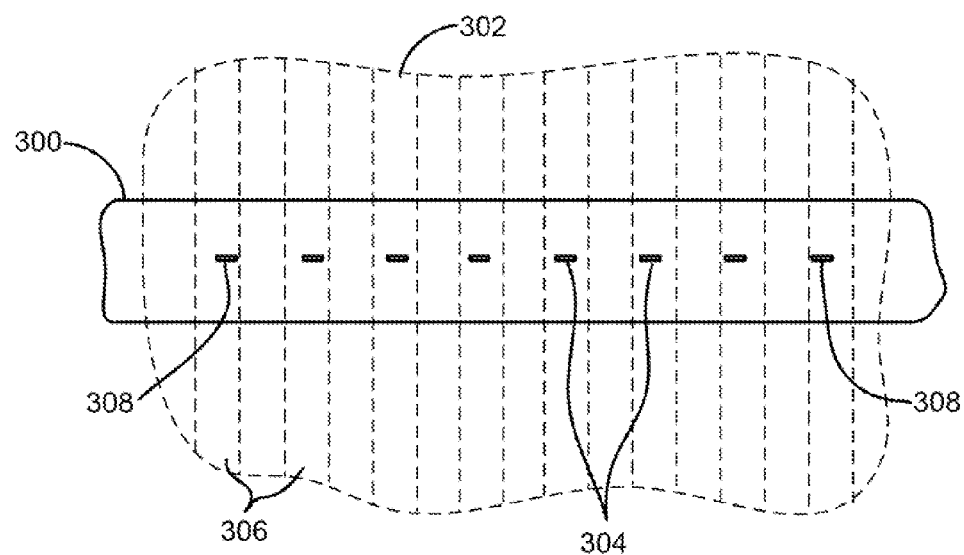

FIGS. 3-4B represent the effect of tape lateral contraction and expansion on reader position relative thereto. FIG. 3 shows a head 300 relative to the tape 302, where the tape has a nominal width. As shown, the readers 304 are aligned with the data tracks 306 on the tape 302. FIG. 4A shows the effect of tape lateral contraction. As shown, the outermost readers 308 are at least proximate to the outer edges of the outer data tracks. FIG. 4B shows the effect of tape lateral expansion. As shown, the outermost readers 308 are at least proximate to the inner edges of the outer data tracks. Because all of the readers 304 generally have the same width, the readback signal level from each reader will normally be the same.

In various embodiments, the foregoing is achieved by contracting and dilating a module of the head by adjusting an amount of compression applied to one or more ends of the module, thereby selectively altering the pitch of the transducers in the array. For example, if the tape is in an expanded state, the system dilates the module dimension. If the tape is compressed, the system compresses the module to approximate the tape contraction. Note that the dilating or compressing may include allowing the dilation, e.g., by allowing reducing the compression of the module. As will soon become apparent, the compression of the module may be effected by thermal, mechanical, and/or electrical mechanisms.

In various approaches, a system includes a multi-transducer head of any type. For example, the head may be a two-module tape head similar to the head set forth above.

Other approaches might have a single module, or more than two modules. In particularly preferred approaches, the transducers are not formed on a substrate of or having piezoelectric material. Rather, the module may be of any design, and coupled to a sizing mechanism for compressing and/or dilating the module. The module is adhered to a selectively expandable and/or contractable sizing mechanism. For example, the module can be adhered to a member that is compressed, etc. or alternatively the module may be directly coupled to the sizing mechanism.

In one illustrative embodiment, the head is formed on a wafer with a pitch of the transducers that is at or above an expected maximum pitch of the data tracks on the tape. For example, the pitch may be slightly larger than what is expected to be a nominal state of the module. The module may then be compressed by the sizing mechanism, which is a separate component than the module, to achieve the nominal state. A converse construction may be employed in other embodiments, e.g., where a small pitch is selected and the sizing mechanism is used to dilate the module to expand the pitch as needed.

In preferred embodiments, the system includes a module having multiple transducers, and a sizing mechanism for applying a force to at least one lateral side of the module for selectively compressing the module, thereby adjusting a pitch between the transducers. The lateral sides of the module intersect an axis of the module oriented parallel to the direction of the force, i.e., are not the top or bottom of the module.

In a particularly preferred embodiment, as shown in FIGS. 5A-5D, the sizing mechanism 502 includes a bracket that applies a selective clamping force on the lateral sides of the module 504.

Figure 5A:
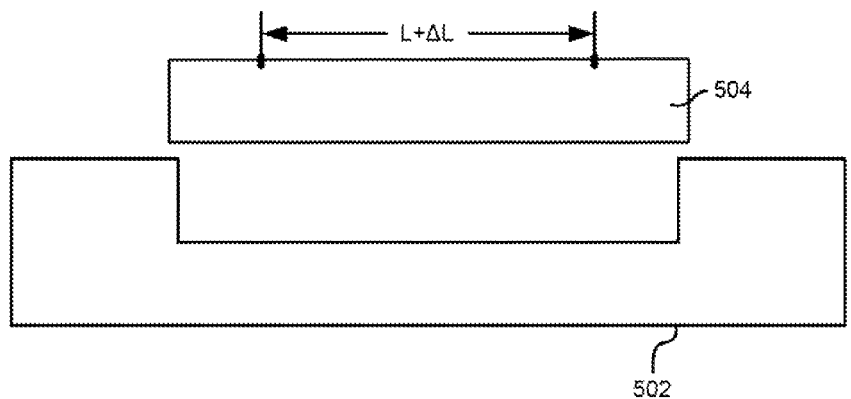
FIGS. 5A-5D are simplified system diagrams of an embodiment of the present invention.

Referring to FIG. 5A, a dilated (relaxed) module 504 and a sizing mechanism 502 are shown. As shown in this example, a spacing between the servo readers of the relaxed module is $L+\Delta L$, where L represents about the smallest expected in-use spacing between servo readers, and $L+\Delta L$ represents about a maximum expected in-use spacing.

Figure 5B:
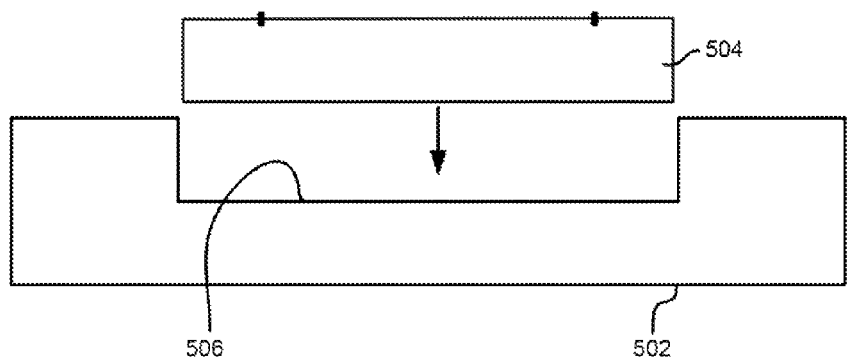
Figure 5C:
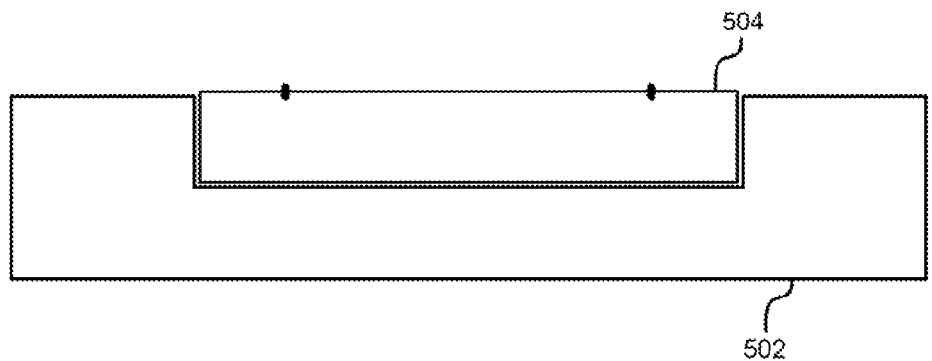

Referring to FIG. 5B, the temperature of the sizing mechanism is increased to cause the sizing mechanism to expand, thereby allowing insertion of the module into the channel 506 as shown in FIG. 5C. An optional adhesive may be used to couple the module to the sizing mechanism.

Figure 5D:
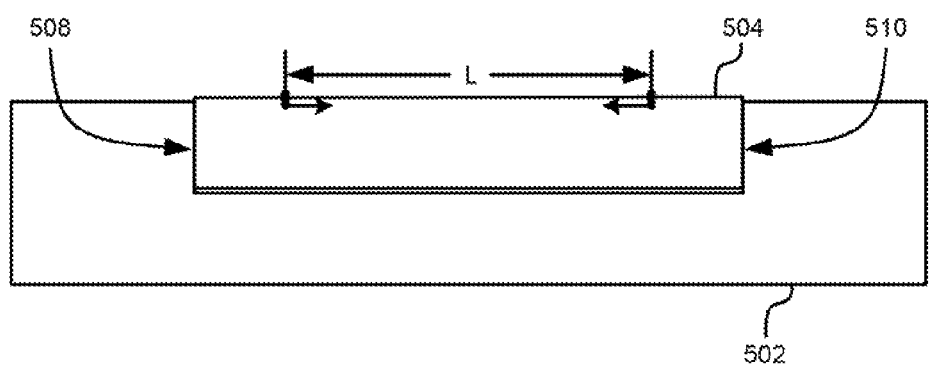

Referring to FIG. 5D, upon allowing the sizing mechanism to cool, the sizing mechanism compresses or "squeezes" the opposite lateral sides 508, 510 of the module, with the result that the span between elements is now less than in the uncompressed state by an amount that depends on the dimensional stability of the medium and on the relative magnitude of thermal effects. In a nominal state, the sizing mechanism may compress the module so that the spacing between the servo transducers is L, as shown. When the sizing mechanism expands, such as upon being heated, the compression on the module is decreased, and the spacing between transducers in the module is allowed to increase. By controlling the temperature of the sizing mechanism, the spacing between module transducers can be adjusted to approximate the spacing between tracks on a particular tape medium being written to or read.

The amount of compression applied to the module may depend in part on the medium dimensional stability. For typical data tapes, stability is approximately 500-800 ppm. For a Linear Tape Open standard head this corresponds to approximately 2 microns of span change. Thus, heads conforming to the LTO format specification may incorporate this approximately 2 micron spacing increase at the mask level.

In an alternate embodiment, the sizing mechanism functionally equivalent to that shown in FIG. 5D includes a piezoelectric material that induces compression or dilation of the sizing mechanism to apply varying levels of compression to the lateral sides of the module.

Figure 5E:
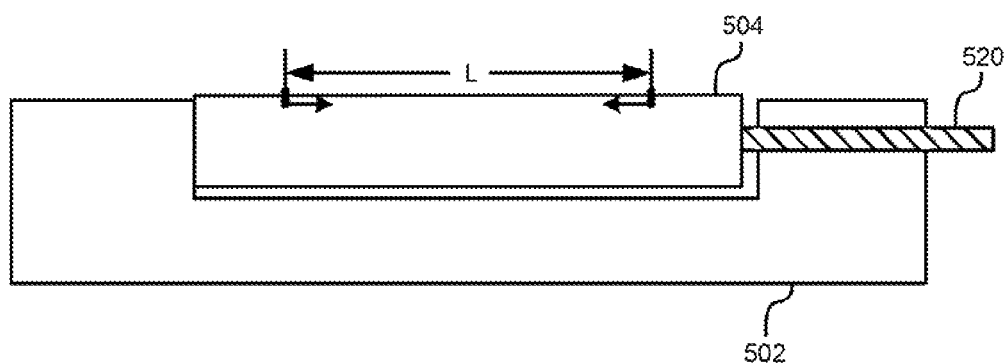
FIG. 5E is a simplified system diagram of an embodiment of the present invention.

In a further alternate embodiment, as shown in FIG. 5E, the channel of the sizing mechanism may be made larger than the module, and a piece 520 such as a threaded beam, a shim, etc. can be used to engage the end of the module. The functionality of the sizing mechanism of FIG. 5E is functionally equivalent to that of FIG. 5D. In both embodiments, when the sizing mechanism contracts or expands, the module is also manipulated. Such an embodiment may allow the use of a given sizing mechanism design with multiple modules, reduce or eliminate any need for tight design tolerances, etc.

Figure 6:
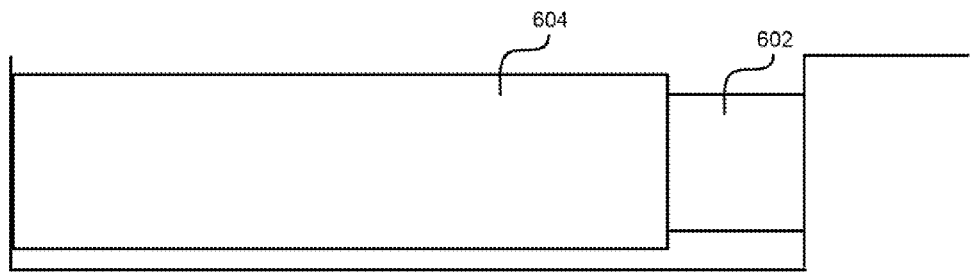
FIG. 6 is a simplified system diagram of an embodiment of the present invention.

FIG. 6 depicts yet another embodiment in which a sizing mechanism 602 actively exerts lateral compression on the module 604. The sizing mechanism may be mechanically activated, thermally activated, piezoelectrically activated, etc.

Figure 7:
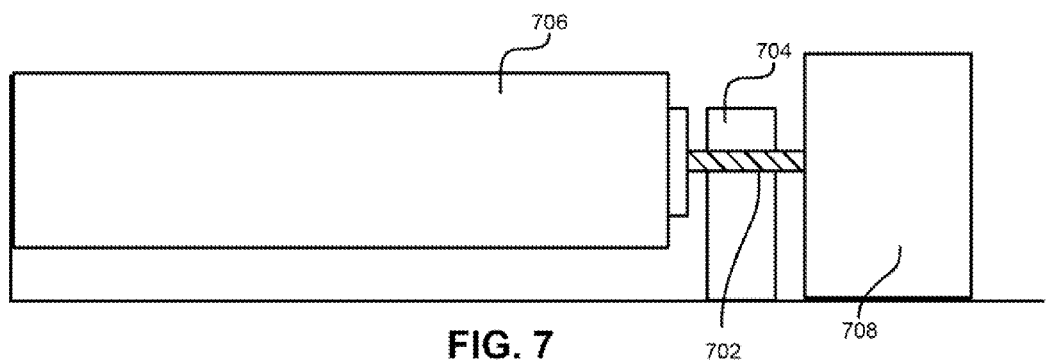
FIG. 7 is a simplified system diagram of an embodiment of the present invention.

FIG. 7 illustrates an embodiment having a mechanical sizing mechanism, in this case a threaded part (e.g., worm screw) 702 extending through a fixed, stationary portion 704. Rotation of the worm screw relative to the stationary portion adjusts the compression applied thereby to the module 706. A motor 708 may be used to rotate the worm screw.

Figure 8:
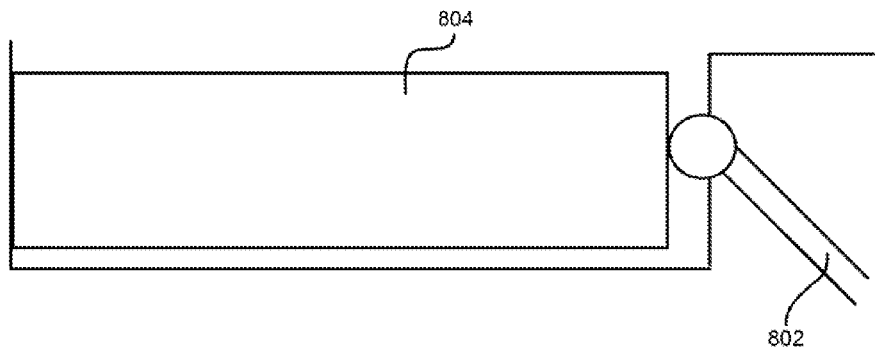
FIG. 8 is a simplified system diagram of an embodiment of the present invention.

FIG. 8 depicts an embodiment having a mechanical sizing mechanism, in this case a lever 802 having a cam that adjusts the compression applied thereby to the module 804. An actuator, motor, etc. may be used to adjust the lever.

In a further embodiment, a mechanical sizing mechanism may be an actuator that pushes on the lateral side of the module.

Figure 9:
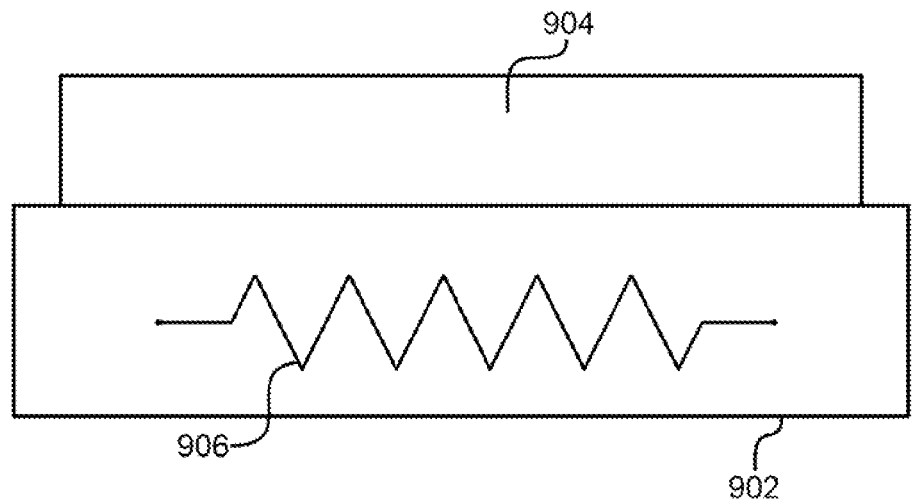
FIG. 9 is a simplified system diagram of an embodiment of the present invention.

In one embodiment, shown in FIG. 9, the sizing mechanism includes a substrate 902, e.g., of aluminum or other material with a coefficient of thermal expansion and/or Young's modulus suitable for generating the desired compression and/or dilation of the module 904. The substrate is coupled to the module, e.g., via an adhesive, pins, welding, etc. The substrate is heated to adjust a dimension thereof, e.g., cause expansion thereof, which in turn expands the ends of the module away from each other. The substrate may be heated via any suitable mechanism, including resistive (Joule) heating of the substrate or of a heating element 906 coupled thereto, raising of an ambient temperature, laser-induced heating, etc. In a similar manner, the substrate may be cooled to cause the substrate to contract. In further approaches, the substrate may be heated for causing expansion thereof and cooled at other times for causing contraction thereof.

Figure 10:
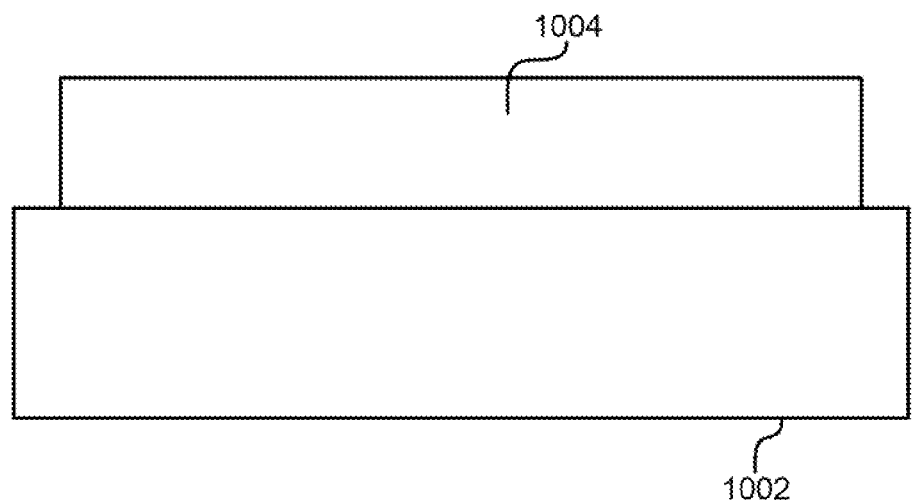
FIG. 10 is a simplified system diagram of an embodiment of the present invention.

In another approach, shown in FIG. 10, the sizing mechanism includes a piezo structure 1002 that is created separately from the module, or acquired, as an independent component. The piezo structure is adhered to the module 1004. The piezo structure may include one or more layers, including a piezoelectric material. A change in the voltage applied to the piezo structure causes the piezo structure to expand and/or contract. The module tends to follow the piezo structure.

In the approaches of FIGS. 9 and 10, it may be desirable to couple the sizing mechanism to only the ends of the module, with the central portion of the module being detached from the sizing mechanism. In fact, such decoupling is critical in some embodiments to prevent decoupling of the sizing mechanism from the module due to stresses induced by differences in thermal expansion coefficients of the parts.

Figure 11:
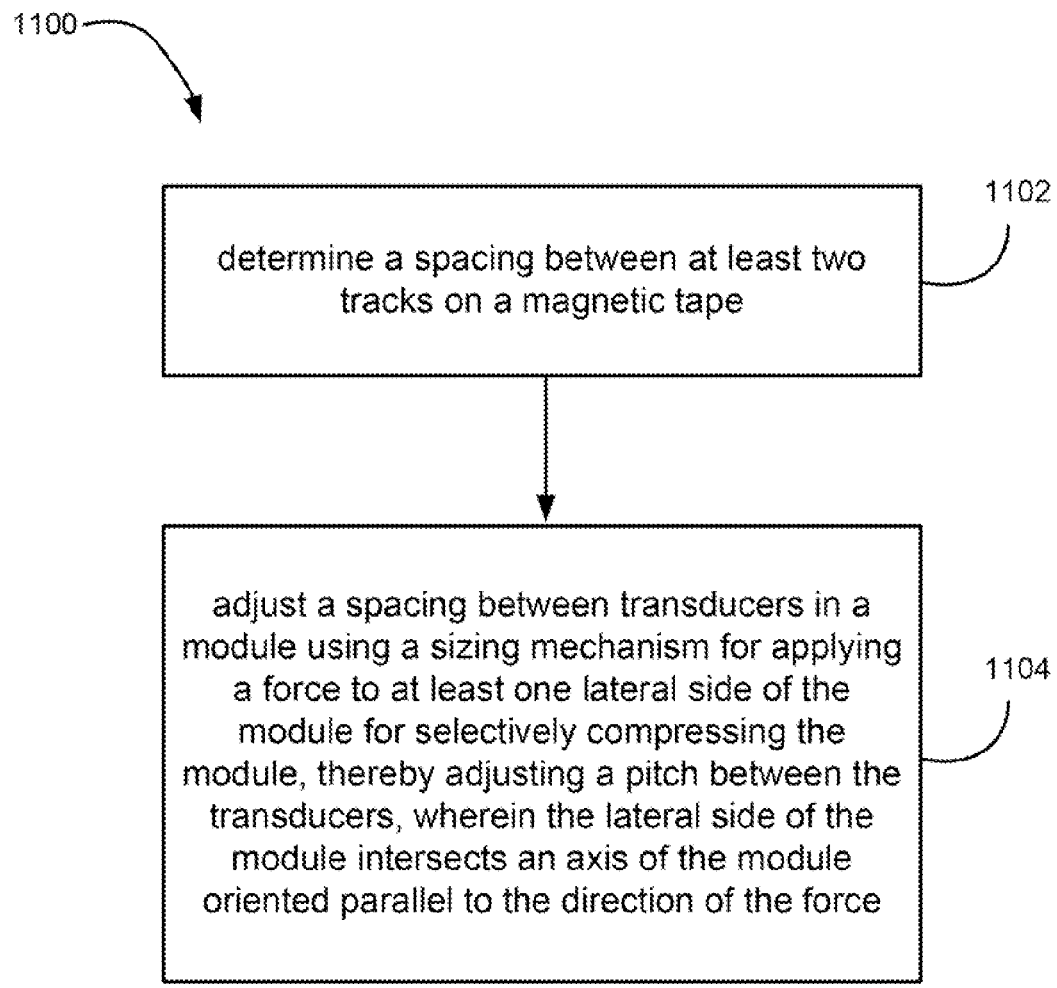
FIG. 11 is a process flow diagram according to one embodiment of the present invention.

A method 1100 for setting the spacing between transducers according to one embodiment is shown in FIG. 11. In operation 1102, a spacing between at least two tracks on a magnetic tape is determined. In operation 1104, a spacing between transducers in the module is adjusted using a sizing mechanism for actively applying a force to at least one lateral side of the module for selectively compressing the module, thereby adjusting a pitch between the transducers, wherein the lateral side of the module intersects an axis of the module oriented parallel to the direction of the force.

Information previously written on the tape may be used to determine the proper module transducer spacing. An exemplary mechanism for establishing the proper module transducer spacing is to adjust the compression to equalize or otherwise use the timing interval read by at least two servo readers. For writing operations, a preferred mode is to use servo data, but this is not absolutely required.

In another approach, the proper module transducer spacing may be based on data signals. For example, the system may set the transducer spacing at a nominal value, and then adjust the spacing thereof to obtain a suitable readback function across the read channels, i.e., the data can be properly read back.

In yet another approach, servo data embedded in the data tracks may be used.

In a further approach, both customer data and servo data may be used.

In yet another approach, data written by the end user may be used to facilitate determining the head pitch.

Adjustments can be performed any time, such as during an initialization period prior to reading or writing user data, during readback or writing operations, etc.

It will be clear that the various features of the foregoing methodologies may be combined in any way, creating a plurality of combinations from the descriptions presented above.

It will also be clear to one skilled in the art that the methodology of the present invention may suitably be embodied in a logic apparatus comprising logic to perform various steps of the methodology presented herein, and that such logic may comprise hardware components or firmware components.

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

It will be appreciated that the methodology described above may also suitably be carried out fully or partially in software running on one or more processors (not shown), and that the software may be provided as a computer program element carried on any suitable data carrier (also not shown) such as a flash memory, magnetic or optical data disc. The channels for the transmission of data likewise may include storage media of all descriptions as well as signal carrying media, such as wired or wireless signal media.

Embodiments of the present invention may suitably be embodied as a computer program product for use with a computer system. Such an implementation may comprise a series of computer readable instructions either fixed on a tangible medium, such as a computer readable medium, for example, flash memory, CD-ROM, ROM, or hard disk, or transmittable to a computer system, via an interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Communications components such as input/output or I/O devices (including but not limited to keyboards, displays, pointing devices, etc.) can be coupled to the system either directly or through intervening I/O controllers.

Communications components such as buses, interfaces, network adapters, etc. may also be coupled to the system to enable the data processing system, e.g., host, to become coupled to other data processing systems or remote printers or storage devices through intervening private or public networks. Modems, cable modem and Ethernet cards are just a few of the currently available types of network adapters.

While various embodiments have been described above, it should be understood that they have been presented by way of example only, and not limitation. Thus, the breadth and scope of an embodiment of the present invention should not be limited by any of the above-described exemplary embodi-

What is claimed is:

1. A system, comprising:
a module having multiple transducers; and
a sizing mechanism for actively applying a force to at least one lateral side of the module for selectively compressing the module, thereby adjusting a pitch between the transducers,
wherein the lateral side of the module intersects an axis of the module oriented parallel to the direction of the force.

2. The system as recited in claim 1, wherein the module and the sizing mechanism are separate components, wherein the sizing mechanism is configured to alter a physical dimension of the module via applying the force.

3. The system as recited in claim 1, further comprising a mechanism for adjusting a temperature of the sizing mechanism for adjusting a dimension thereof.

4. The system as recited in claim 1, wherein the sizing mechanism is a mechanical mechanism that applies the force upon movement thereof relative to a stationary portion.

5. The system as recited in claim 4, wherein the sizing mechanism is selected from a group consisting of a threaded part and a lever.

6. The system as recited in claim 1, wherein the sizing mechanism is piezoelectric and applies the force upon application of a voltage thereto.

7. The system as recited in claim 1, wherein the sizing mechanism actively applies the force to opposite lateral sides of the module.

8. The system as recited in claim 1, wherein the sizing mechanism is configured to relax a magnitude of the force thereby allowing the module to expand and increase the pitch between the transducers from a pitch thereof at a nominal state of the module.

9. A system, comprising:
a magnetic head comprising a module having multiple transducers;
a sizing mechanism for applying a force to at least one lateral side of the module for selectively altering a level of compression applied to the module by the force, thereby adjusting a spacing between the transducers to approximate a pitch of data tracks on a magnetic recording tape, wherein the lateral side of the module intersects an axis of the module oriented parallel to the direction of the force;
a drive mechanism for passing a magnetic medium over the magnetic head, and
a controller electrically coupled to the magnetic head.

10. The system as recited in claim 9, wherein the module and the sizing mechanism are separate components, wherein the sizing mechanism is configured to alter a physical dimension of the module via the applying the force.

11. The system as recited in claim 9, further comprising a mechanism for adjusting a temperature of the sizing mechanism for adjusting a dimension thereof.

12. The system as recited in claim 9, wherein the sizing mechanism is a mechanical mechanism that applies the force upon movement thereof relative to a stationary portion.

13. The system as recited in claim 9, wherein the sizing mechanism is piezoelectric and applies the force upon application of a voltage thereto.

14. The system as recited in claim 9, wherein the sizing mechanism applies the force to opposite lateral sides of the module.

15. The system as recited in claim 9, wherein the sizing mechanism is configured to relax the force thereby allowing the module to expand and increase the spacing between the transducers from a pitch thereof at a nominal state of the module.

16. A method, comprising:
determining a spacing between at least two tracks on a magnetic tape; and
adjusting a spacing between transducers in a module using a sizing mechanism for actively applying a force to at least one lateral side of the module for selectively compressing the module, thereby adjusting a pitch between the transducers, wherein the lateral side of the module intersects an axis of the module oriented parallel to the direction of the force.

17. The method as recited in claim 16, wherein the spacing between the at least two tracks is determined using servo readback signals.

18. The method as recited in claim 16, wherein the spacing between the at least two tracks is determined using signals from data tracks.

19. The method as recited in claim 16, wherein the adjusting includes altering a temperature of the sizing mechanism.

20. The method as recited in claim 16, wherein the adjusting include applying a voltage to the sizing mechanism.

* * * * *